(12) United States Patent
Iihoshi et al.

(10) Patent No.: US 12,516,953 B1
(45) Date of Patent: *Jan. 6, 2026

(54) ROAD SURFACE EVALUATION APPARATUS AND ROAD SURFACE EVALUATION METHOD

(71) Applicant: Honda Motor Co., Ltd., Tokyo (JP)

(72) Inventors: Akira Iihoshi, Tokyo (JP); Yasuo Oishi, Tokyo (JP); Atsuki Kakinuma, Tokyo (JP); Takeo Tokunaga, Tokyo (JP); Hiroyuki Onimaru, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

This patent is subject to a terminal disclaimer.

(21) Appl. No.: 18/026,182

(22) PCT Filed: Sep. 13, 2021

(86) PCT No.: PCT/JP2021/033492
§ 371 (c)(1),
(2) Date: Mar. 14, 2023

(87) PCT Pub. No.: WO2022/059636
PCT Pub. Date: Mar. 24, 2022

(30) Foreign Application Priority Data

Sep. 17, 2020 (JP) .................................. 2020-155981

(51) Int. Cl.
*G01C 21/00* (2006.01)
(52) U.S. Cl.
CPC ..... *G01C 21/3815* (2020.08); *G01C 21/3841* (2020.08); *G01C 21/3885* (2020.08)

(58) Field of Classification Search
CPC ............ G01C 21/3815; G01C 21/3841; G01C 21/3885; G01C 21/3822; B60W 2756/10;
(Continued)

(56) References Cited

U.S. PATENT DOCUMENTS 8,972,192 B2 * 3/2015 Bespalov ................ G06F 16/29
702/2
9,108,640 B2 * 8/2015 Jackson .................. H04L 67/12
(Continued)

FOREIGN PATENT DOCUMENTS

CN 109931856 A 6/2019
EP 3705627 A1 9/2020
(Continued)

OTHER PUBLICATIONS

International Search Report; Application PCT/JP2021/033492; Nov. 22, 2021.

*Primary Examiner* — Mussa A Shaawat
(74) *Attorney, Agent, or Firm* — Duft & Bornsen, PC

(57) ABSTRACT

A road surface evaluation apparatus includes an electronic control unit having a microprocessor and a memory. The microprocessor is configured to perform acquiring driving information of each of a plurality of vehicles, including position information of the plurality of vehicles while driving and acceleration information indicating acceleration of the plurality of vehicles and map information including road information; evaluating the road roughness based on the acquired acceleration information of the plurality of vehicles; and outputting information on the evaluated road surface roughness in association with the acquired road information.

11 Claims, 11 Drawing Sheets

(58) Field of Classification Search
CPC .............. B60W 40/06; B60W 2552/35; G08G 1/0133; G08G 1/0141; G08G 1/096775; G08G 1/0112; G08G 1/096741; G08G 1/0969

See application file for complete search history.

(56) References Cited

U.S. PATENT DOCUMENTS

| | | | |
|---|---|---|---|
| 10,953,887 B2* | 3/2021 | Magnusson | G08G 1/164 |
| 11,433,904 B2* | 9/2022 | Magnusson | G08G 1/0141 |
| 2013/0170701 A1* | 7/2013 | Suzuki | G06T 7/00 |
| | | | 382/103 |
| 2014/0025292 A1* | 1/2014 | Stahlin | G08G 1/0141 |
| | | | 701/461 |
| 2014/0303806 A1* | 10/2014 | Bai | G01C 21/3697 |
| | | | 701/1 |
| 2015/0006069 A1* | 1/2015 | Kwon | G08G 1/0141 |
| | | | 701/119 |
| 2015/0183440 A1* | 7/2015 | Jackson | G07C 5/0808 |
| | | | 701/32.4 |
| 2015/0224925 A1* | 8/2015 | Hartmann | G06V 20/56 |
| | | | 348/148 |
| 2016/0042644 A1* | 2/2016 | Velusamy | G08G 1/096775 |
| | | | 340/435 |
| 2016/0076991 A1* | 3/2016 | Diamond | G08G 1/0141 |
| | | | 73/146 |
| 2016/0244065 A1* | 8/2016 | Wagner | B60G 17/0185 |
| 2017/0241778 A1* | 8/2017 | Hanatsuka | G08G 1/01 |
| 2017/0259734 A1* | 9/2017 | Imaishi | G08G 1/166 |
| 2018/0195973 A1* | 7/2018 | Yonekawa | G01B 11/30 |
| 2020/0139976 A1* | 5/2020 | Magnusson | G01C 21/3822 |
| 2020/0238999 A1* | 7/2020 | Batts | B60W 30/09 |
| 2021/0095972 A1* | 4/2021 | Jacobus | G01C 21/3841 |
| 2022/0126855 A1* | 4/2022 | Bartels | B60T 7/22 |
| 2022/0363288 A1* | 11/2022 | Kim | G01S 7/4808 |
| 2022/0412756 A1* | 12/2022 | Shikanai | G01C 21/3461 |
| 2023/0234602 A1* | 7/2023 | Onimaru | B60W 50/14 |
| | | | 340/905 |
| 2023/0243113 A1* | 8/2023 | Kakinuma | E01C 23/01 |
| | | | 702/167 |
| 2023/0358559 A1* | 11/2023 | Iihoshi | G01C 21/3885 |

FOREIGN PATENT DOCUMENTS

| | | |
|---|---|---|
| JP | H07239341 A | 9/1995 |
| JP | 2002012138 A | 1/2002 |
| JP | 2012168796 A | 9/2012 |
| JP | 2012171430 A | 9/2012 |
| JP | 2018120409 A | 8/2018 |
| JP | 2018180895 A | 11/2018 |
| JP | 2020013537 A | 1/2020 |
| WO | 2018025341 A1 | 2/2018 |

* cited by examiner

*FIG. 11*

| MODEL | GRADE | SUSPENSION | | TIRE | |
|---|---|---|---|---|---|
| | | TYPE | CORRECTION FACTOR | TYPE | CORRECTION FACTOR |
| ABC | HIGH | SS_11 | $\alpha 11$ | tr_11 | $\beta 11$ |
| | STANDARD | SS_12 | $\alpha 12$ | tr_12 | $\beta 12$ |
| | LOW | SS_13 | $\alpha 13$ | tr_13 | $\beta 13$ |
| XYZ | HIGH | SS_21 | $\alpha 21$ | tr_21 | $\beta 21$ |

ROAD SURFACE EVALUATION APPARATUS AND ROAD SURFACE EVALUATION METHOD

CROSS-REFERENCE TO RELATED APPLICATION

This application is a National Stage of PCT international application Ser. No. PCT/JP2021/033492 filed on Sep. 13, 2021 which designates the United States, incorporated herein by reference, and which is based upon and claims the benefit of priority from Japanese Patent Application No. 2020-155981, filed on Sep. 17, 2020, the entire contents of which are incorporated herein by reference.

TECHNICAL FIELD

This invention relates to a road surface evaluation apparatus and a road surface evaluation method that evaluate a road surface profile representing unevenness of a road surface.

BACKGROUND ART

As a prior-art apparatus of this type, it is known that a road surface profile representing the unevenness of the road surface on which a vehicle has driven is detected based on the acceleration measured by an acceleration sensor installed in the vehicle (see, for example, Patent Literature 1).

CITATION LIST

Patent Literature

Patent Literature 1: Japanese Unexamined Patent Publication No. 2002-12138

DISCLOSURE OF INVENTION

Problems to be Solved by the Invention

However, in the method of evaluating road surface profiles with the apparatus described in Patent Literature 1 described above, it is necessary to drive a special vehicle equipped with the apparatus on the road to detect the road surface profile, which prevents easy evaluation of the road surface profile.

Means for Solving Problem

An aspect of the present invention is a road surface evaluation apparatus including: a driving information acquisition unit configured to acquire driving information of each of a plurality of vehicles, including position information of the plurality of vehicles while driving and acceleration information indicating acceleration of the plurality of vehicles: a map information acquisition unit configured to acquire map information including road information: a roughness evaluation unit configured to evaluate a road roughness based on the acceleration information of the plurality of vehicles acquired by the driving information acquisition unit; and an output unit configured to output information on the road surface roughness evaluated by the roughness evaluation unit in association with the road information acquired by the map information acquisition unit.

Another aspect of the present invention is a road surface evaluation method causing a computer to execute steps of: acquiring driving information of each of a plurality of vehicles, including position information of the plurality of vehicles while driving and acceleration information indicating acceleration of the plurality of vehicles: acquiring map information including road information: evaluating the road roughness based on the acquired acceleration information of the plurality of vehicles; and outputting information on the evaluated road surface roughness in association with the road information.

Effect of the Invention

The present invention allows efficient evaluation of road surface profiles.

BRIEF DESCRIPTION OF THE DRAWINGS

FIG. 11 is an example of a correction coefficient table.

DESCRIPTION OF EMBODIMENT

Figure 1:
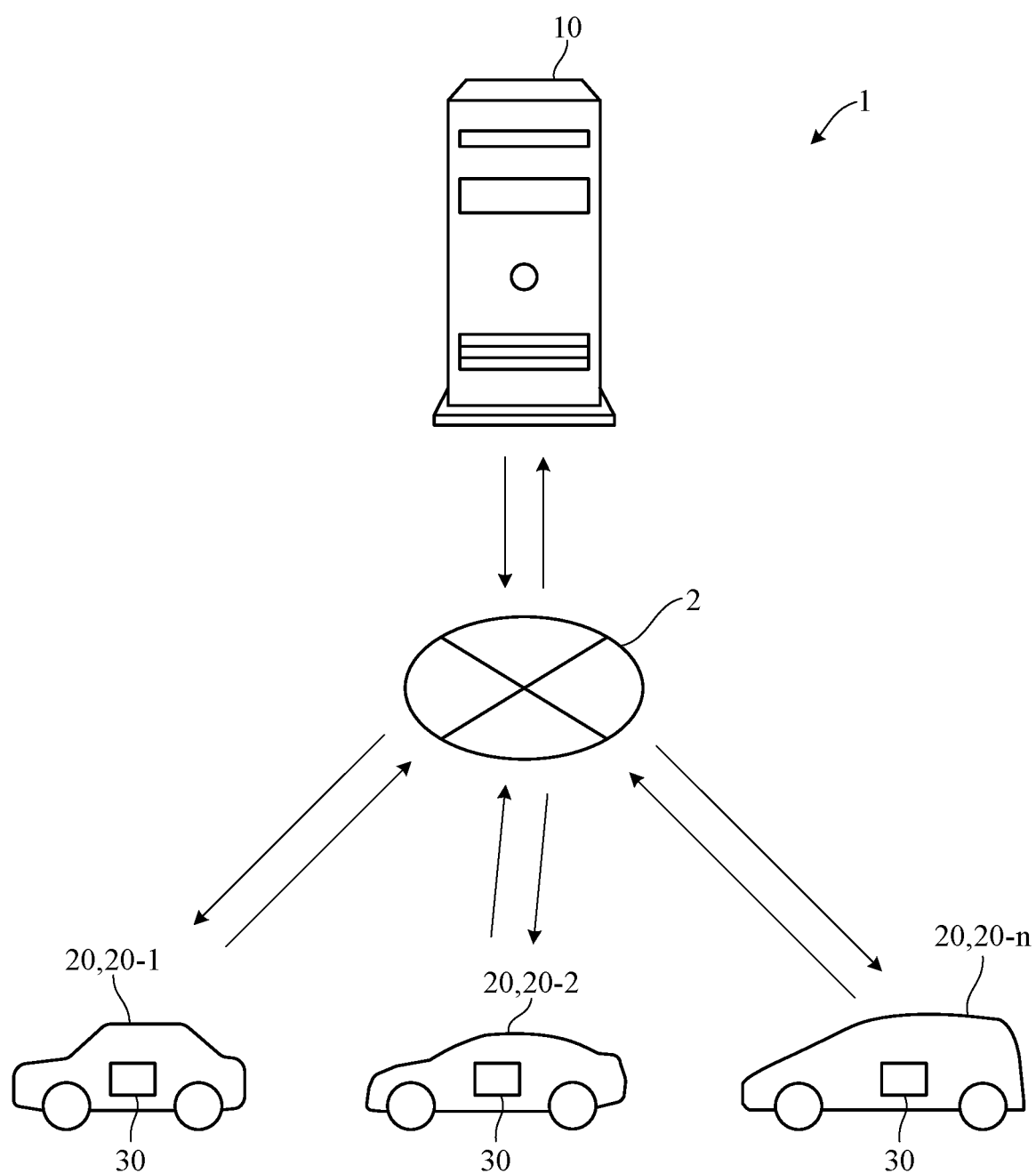
FIG. 1 is a diagram illustrating an example of the configuration of a road surface evaluation system including a road surface evaluation apparatus according to the present embodiment.

An embodiment of the present invention will be described below with reference to FIGS. 1 to 11. The road surface evaluation apparatus according to the present embodiment is an apparatus for evaluating the road surface profile of a road on which a vehicle is driving. FIG. 1 illustrates an example of the configuration of a road surface evaluation system including a road surface evaluation apparatus according to the present embodiment. As illustrated in FIG. 1, a road surface evaluation system 1 includes a road surface evaluation apparatus 10 and in-vehicle terminals 30. The road surface evaluation apparatus 10 includes, for example, a server device. The in-vehicle terminals 30 are configured to communicate with the road surface evaluation apparatus 10 via a communication network 2.

The communication network 2 includes not only public wireless communication networks represented by Internet networks and cell phone networks, but also closed communication networks established for each predetermined administrative region, such as wireless LAN, Wi-Fi (registered trademark), and Bluetooth (registered trademark).

The in-vehicle terminals 30 are installed in vehicles 20. The vehicles 20 include a plurality of vehicles 20-1, 20-2, . . . , and 20-n. Note that the vehicles 20 may be manually operated vehicles or automated vehicles. The vehicles 20 may include vehicles of different models and grades.

Figure 2:
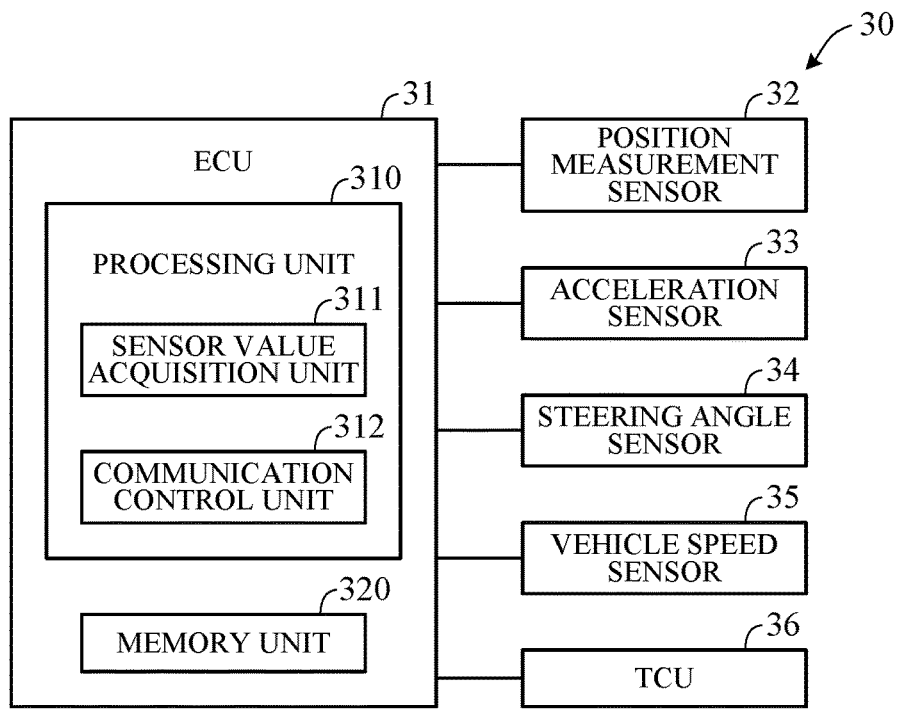
FIG. 2 is a block diagram illustrating key components of an in-vehicle terminal.

FIG. 2 is a block diagram illustrating the key components of the in-vehicle terminal 30 according to the present embodiment. The in-vehicle terminal 30 includes an electronic control unit (ECU) 31, a position measurement sensor 32, an acceleration sensor 33, a steering angle sensor 34, a vehicle speed sensor 35, and a telematic control unit (TCU) 36.

The position measurement sensor 32 is, for example, a GPS sensor, which receives positioning signals transmitted from GPS satellites and detects the absolute position (for example, latitude and longitude) of the vehicles 20. Note that the position measurement sensor 32 includes not only GPS sensors but also sensors that use radio waves transmitted from satellites in various countries, called GNSS satellites, including quasi-zenith orbit satellites.

The acceleration sensor 33 detects the acceleration of the vehicle 20 in the left-right direction, that is, lateral acceleration. Note that the acceleration sensor 33 may be configured to detect acceleration in the front-back direction and vertical direction as well as lateral acceleration of the vehicle 20. The steering angle sensor 34 detects the steering angle of the steering wheel (not shown) of the vehicle 20. The vehicle speed sensor 35 detects the vehicle speed of the vehicle 20.

As illustrated in FIG. 2, the ECU 31 includes a computer including a processing unit 310 such as a CPU (processor), a memory unit 320 such as ROM and RAM, and other peripheral circuits such as I/O interfaces not illustrated. The processing unit 310 functions as a sensor value acquisition unit 311 and a communication control unit 312 by executing programs stored in the memory unit 320 in advance.

The sensor value acquisition unit 311 acquires the detected values of the sensors 33 to 35 and the absolute position of the vehicle 20 detected by the position measurement sensor 32 at a predetermined cycle, for example at 1 Hz (every 1 s). The communication control unit 312 transmits the information acquired by the sensor value acquisition unit 311 (hereinafter referred to as driving information) to the road surface evaluation apparatus 10 at a predetermined cycle via the TCU 36, together with the vehicle ID that can identify the vehicle 20.

The road surface evaluation apparatus 10 detects the unevenness of the road surface, that is, the road surface roughness (hereinafter also referred to as a road surface profile), based on the values detected by the acceleration sensor 33 of the vehicle 20 (in-vehicle terminal 30). The detected road surface profile information is output to, for example, a terminal owned by a road management company or the like, and is used as reference data by the road management company when considering whether or not repairs are necessary. Specifically, the detected values of the acceleration sensor 33 are used to evaluate the road surface profile.

Figure 3:
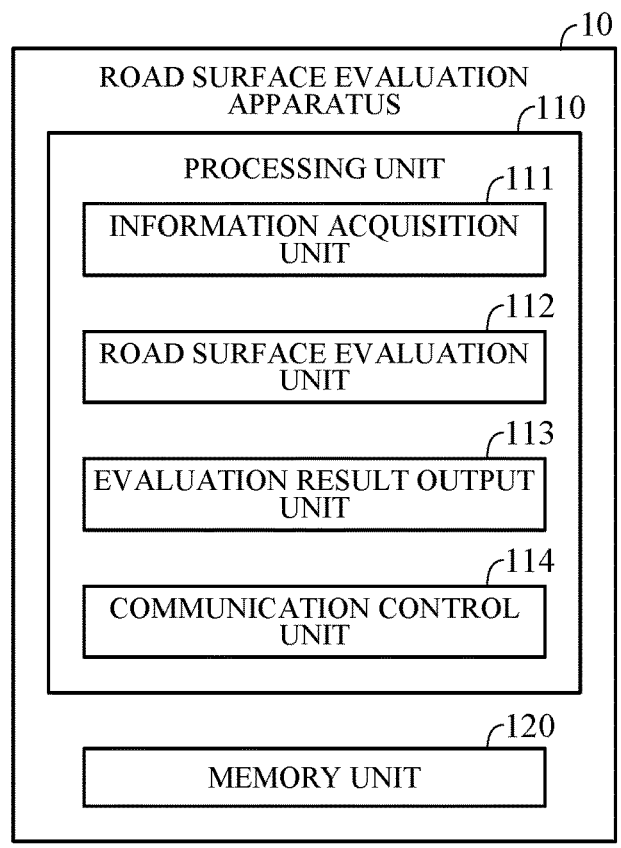
FIG. 3 is a block diagram illustrating key components of the road surface evaluation apparatus according to the present embodiment.

FIG. 3 is a block diagram illustrating the key components of the road surface evaluation apparatus 10 according to the present embodiment. The road surface evaluation apparatus 10 is configured to include a computer including a processing unit 110, such as a CPU, a memory unit 120 such as ROM and RAM, and other peripheral circuits such as I/O interfaces not illustrated. The memory unit 120 stores map information including road maps, and various kinds of information processed by the processing unit 110.

The processing unit 110 executes the programs stored in the memory unit 120, thereby functioning as an information acquisition unit 111, a road surface roughness evaluation unit 112, an evaluation result output unit 113, and a communication control unit 114.

The information acquisition unit 111 receives driving information from the in-vehicle terminals 30 of the plurality of vehicles 20 driving on the road via the communication control unit 114. Note that the information acquisition unit 111 can identify the vehicle 20 from which the driving information is transmitted by the vehicle ID associated with the driving information.

The information acquisition unit 111 stores driving information received from the plurality of vehicles 20 (in-vehicle terminals 30) in the memory unit 120 in time series. Hereafter, the driving information stored in time series in the memory unit 120 is referred to as time-series driving information. The information acquisition unit 111 also acquires map information from the memory unit 120, including information on the road on which the vehicles 20 are driving.

The road surface roughness evaluation unit 112 evaluates the amount of unevenness (depth or height) of the road surface, or road surface roughness, based on the driving information of the plurality of vehicles 20 acquired by the information acquisition unit 111. More specifically, the road surface roughness evaluation unit 112 derives road surface roughness values indicating the degree of road surface roughness based on the lateral accelerations of the plurality of vehicles 20. The road surface roughness values are, for example, values expressed in terms of the International Roughness Index (IRI), which is an international index. Hereinafter, the road surface roughness values may be simply referred to as roughness values.

Figure 4A:
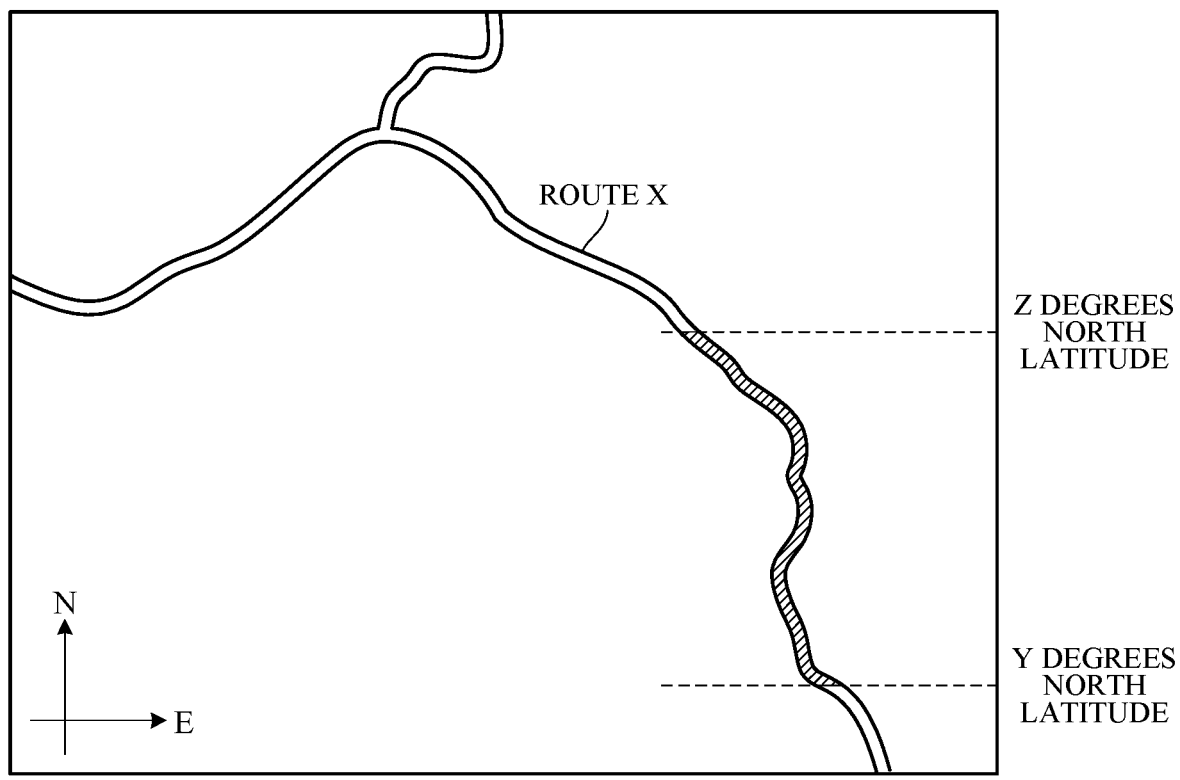
FIG. 4A is a diagram illustrating an example of a map of a road on which vehicles are driving.

FIG. 4A illustrates an example of a map of the road on which the vehicles 20 are driving. FIG. 4A illustrates the predetermined range of road surface roughness to be evaluated (the section with latitude Y to Z on National Route X). In FIG. 4A, the upper direction corresponds to the north direction, and the right direction corresponds to the east direction. The range to be evaluated for road surface roughness can be specified by the user as described below. In a case where the road to be evaluated for road surface roughness has a plurality of lanes on each side, the user may be able to specify the lane to be evaluated for road surface roughness.

Figure 4B:
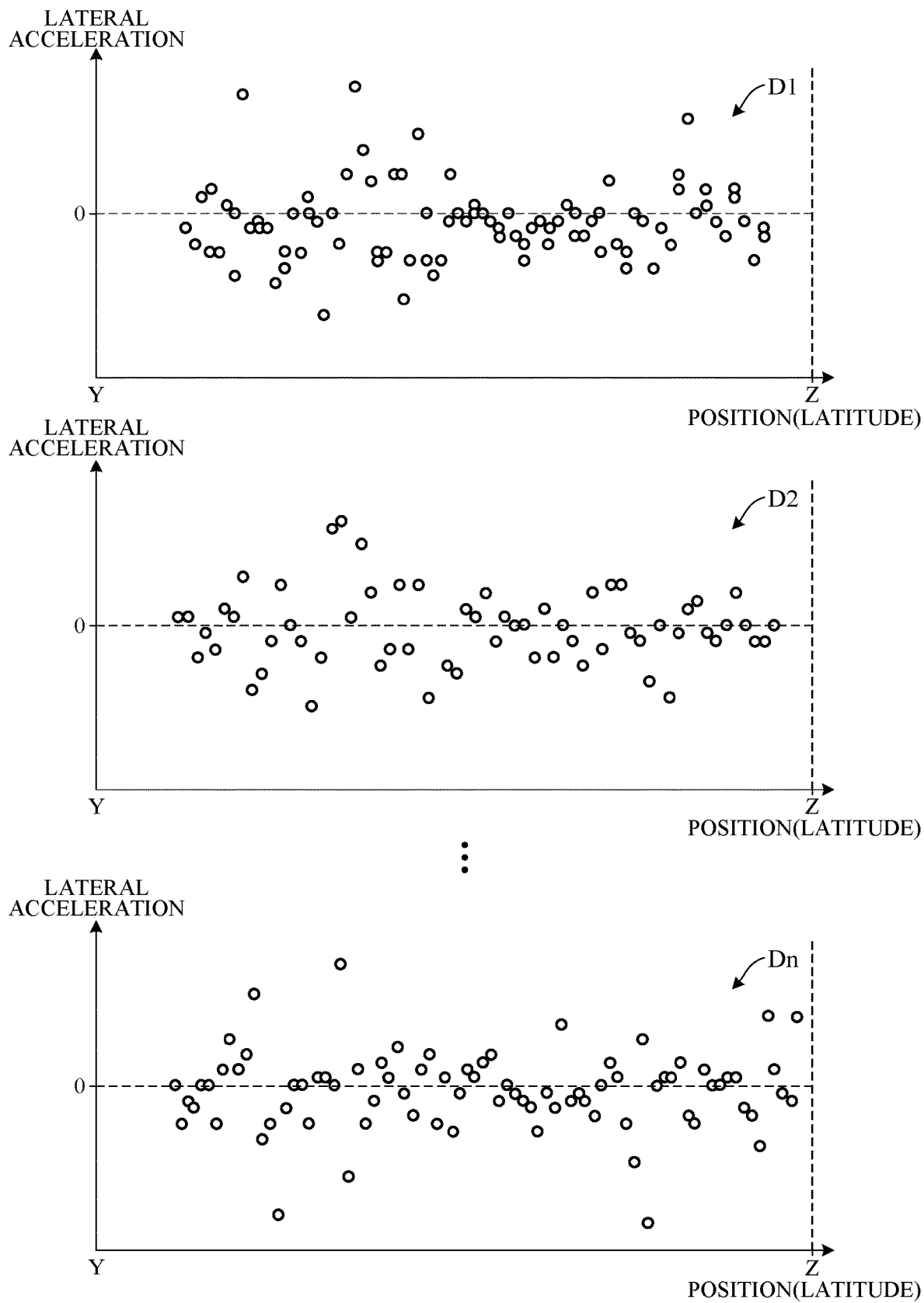
FIG. 4B is a diagram illustrating an example of time-series driving information obtained by the road surface evaluation apparatus from the in-vehicle terminals of the vehicles driving on the road of FIG. 4A.

The driving information acquired at a predetermined sampling cycle (for example, 1 Hz) by the in-vehicle terminal 30 is transmitted to the road surface evaluation apparatus 10 via the communication control unit 312. The driving information includes at least the information on the lateral acceleration of the vehicle 20 detected by the acceleration sensor 33 at the time of sampling (hereinafter referred to as acceleration information) and the absolute position of the vehicle 20 detected by the position measurement sensor 32 at the time of sampling (hereinafter referred to as position information). FIG. 4B illustrates an example of time-series driving information obtained by the road surface evaluation apparatus 10 from the in-vehicle terminals 30 of the plurality of vehicles 20 driving in the predetermined range (the section with latitude Y to Z on National Route X) of FIG. 4A. The horizontal axis in the figure is the position (latitude) of the vehicles 20 in the driving direction along the traveling lane, and the vertical axis is the lateral acceleration of the vehicles 20. Characteristics D1, D2, . . . , Dn represent the time-series driving information of the vehicles 20-1, 20-2, . . . , 20-*n*, respectively.

Note that increasing the above sampling period improves the accuracy of the road surface roughness values derived by the road surface roughness evaluation unit 112, allowing adequate evaluation of the road surface profile. However, a high sampling period (for example, 100 Hz) of driving information increases the processing load of the in-vehicle terminals 30. Furthermore, it increases the data volume of driving information transmitted to the road surface evaluation apparatus 10, which may put pressure on the bandwidth of the communication network 2. Therefore, in consideration of this point, in the present embodiment, the driving information of a first cycle (for example, 1 Hz) transmitted from n vehicles 20 is combined to generate the composite driving information of second cycle (1×n Hz), and the road surface roughness values are derived based on the composite driving information. Here, generation of the composite driving information will be described with reference to FIG. 5.

Figure 5:
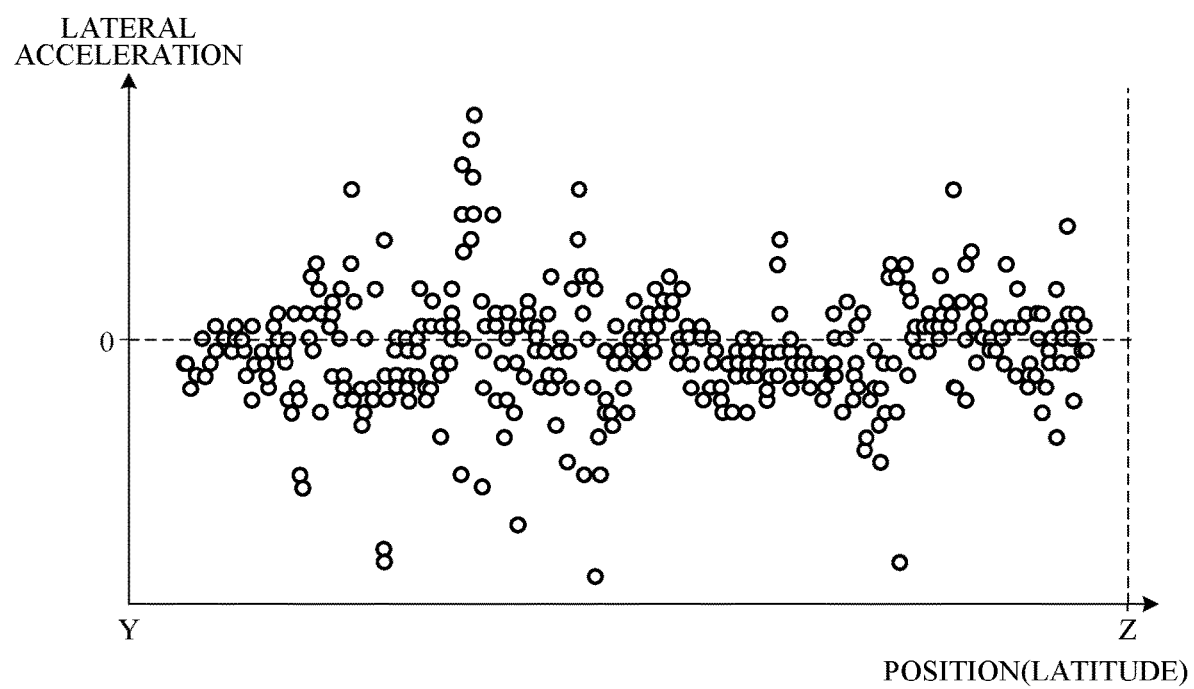
FIG. 5 is a diagram illustrating an example of composite driving information.

FIG. 5 illustrates an example of composite driving information generated based on driving information acquired from the in-vehicle terminals 30 of the plurality of vehicles 20 driving on the road of FIG. 4A. The composite driving information is the information of the acceleration information of the vehicles 20 combined based on the position information of the vehicles 20. The composite driving information illustrated in FIG. 5 is acquired by superimposing the values of the vertical axis (lateral acceleration) for the vehicles 20 illustrated in FIG. 4B with reference to the horizontal axis (latitude). Since the vehicle speeds of the vehicles 20 and the points at which the vehicles 20 start sampling are different, the timing at which the driving information is sampled is considered to be different for each of the vehicles 20, even if the sampling cycle of the driving information for the vehicles 20 is the same. Therefore, by combining the 1 Hz driving information sampled in n vehicles 20 as described above, driving information equivalent to 1×n Hz is acquired. The road surface roughness evaluation unit 112 evaluates the surface roughness of the road on which the vehicles 20 are driving based on the composite driving information acquired in this manner.

In general, the greater the amount of unevenness of the road surface, the greater the lateral acceleration of the vehicles 20, and the road surface roughness values and lateral acceleration have a certain correlation. The road surface roughness evaluation unit 112 uses this correlation information (hereafter referred to as correlation data) to derive the road surface roughness value corresponding to the vehicle position on the road from the lateral acceleration.

Figure 6A:
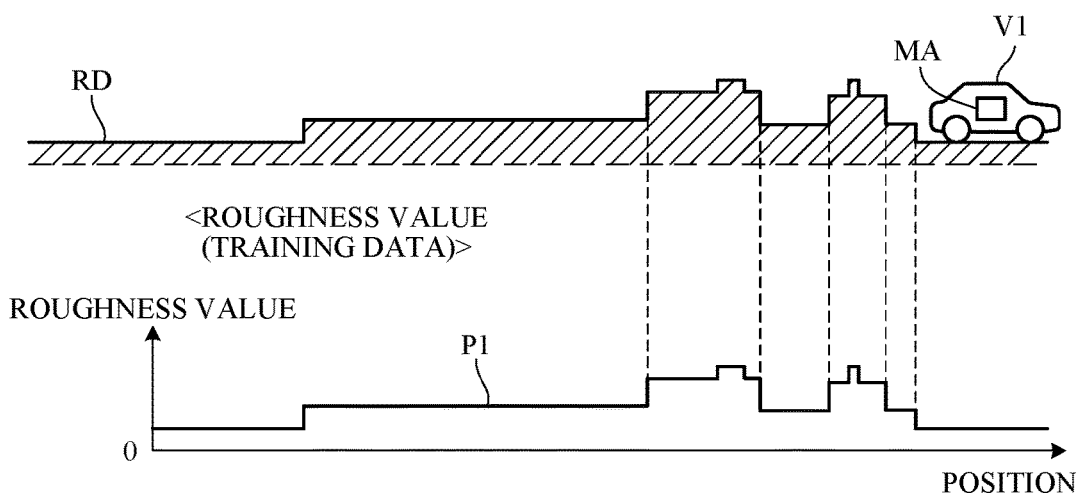
FIG. 6A is a diagram illustrating a training data for road surface roughness values.
Figure 6B:
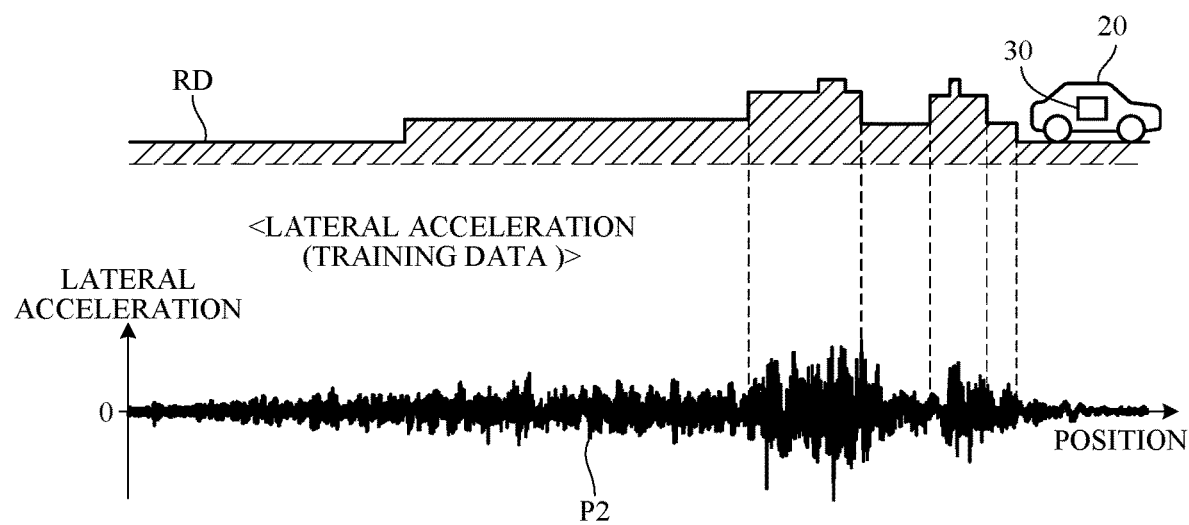
FIG. 6B is a diagram illustrating a training data for lateral acceleration.

First, the road surface roughness evaluation unit 112 executes machine learning using pre-measured road surface roughness values and lateral acceleration as training data to derive the correlation between road surface roughness values and lateral acceleration. FIGS. 6A and 6B illustrate the training data for road surface roughness values and lateral acceleration, respectively. A vehicle V1 illustrated in FIG. 6A is a dedicated vehicle including a measuring instrument MA that measures road surface roughness. The measuring instrument MA measures the road surface roughness values of the road RD when the vehicle V1 is driving on a predetermined road (such as a course for measurement) RD.

A characteristic P1 of FIG. 6A represents the road surface roughness values measured at this time.

FIG. 6B illustrates the vehicles 20 of FIG. 1 driving on the same road RD as that of FIG. 6A. A characteristic P2 of FIG. 6B indicates the lateral acceleration detected by the acceleration sensor 33 installed in the vehicles 20 while the vehicles 20 are driving on the predetermined road RD. The characteristic P1 of FIG. 6A and P2 of FIG. 6B are used as training data when the road surface roughness evaluation unit 112 derives the correlation between road surface roughness values and lateral acceleration, respectively.

The data for characteristics P1 and P2, that is, the training data for road surface roughness values and lateral acceleration, may be stored in the memory unit 120 of the road surface evaluation apparatus 10 or in an external storage device. The road surface roughness evaluation unit 112 executes machine learning using the training data for road surface roughness values and lateral acceleration read from the memory unit 120 or an external storage device to derive the correlation between the road surface roughness values and lateral acceleration. Note that the road surface roughness evaluation unit 112 may also execute machine learning by adding driving speed, acceleration in the front/rear direction, and steering angle as training data.

The road surface roughness evaluation unit 112 derives road surface roughness values for roads driven by the plurality of vehicles 20 based on the correlation between the derived road surface roughness values and lateral acceleration and the composite driving information.

By the way, the acceleration sensor 33 may detect not only the lateral acceleration generated by the unevenness of the road surface when the vehicles 20 are driving on a curve road, but also the lateral acceleration due to centrifugal force and roll motion generated by the speed and steering angle of the vehicles 20. That is, the lateral acceleration detected by the acceleration sensor 33 of the in-vehicle terminal 30 is a mixture of the lateral acceleration caused by the unevenness of the road surface and the lateral acceleration caused by the roll motion or centrifugal force of the vehicle 20.

Therefore, in the present embodiment, in order to derive road surface roughness values more accurately, the road surface roughness evaluation unit 112 extracts the lateral acceleration caused by road surface unevenness from the lateral acceleration of the vehicles 20 indicated by the acceleration information, by removing the lateral acceleration caused by the roll motion or centrifugal force of the vehicles 20.

Specifically, first, the road surface roughness evaluation unit 112 acquires information on the vehicle speed detected by the vehicle speed sensor 35 and the steering angle detected by the steering angle sensor 34 from the driving information of the plurality of vehicles 20. The road surface roughness evaluation unit 112 estimates the roll angle and centrifugal force of the vehicles 20 using the acquired information on vehicle speed and steering angle. The road surface roughness evaluation unit 112 applies a filter (variable filter) according to the estimated roll angle and centrifugal force of the vehicles 20 to the composite driving information to remove the component of lateral acceleration caused by the roll motion or centrifugal force of the vehicles 20 from the composite driving information.

Figure 7A:
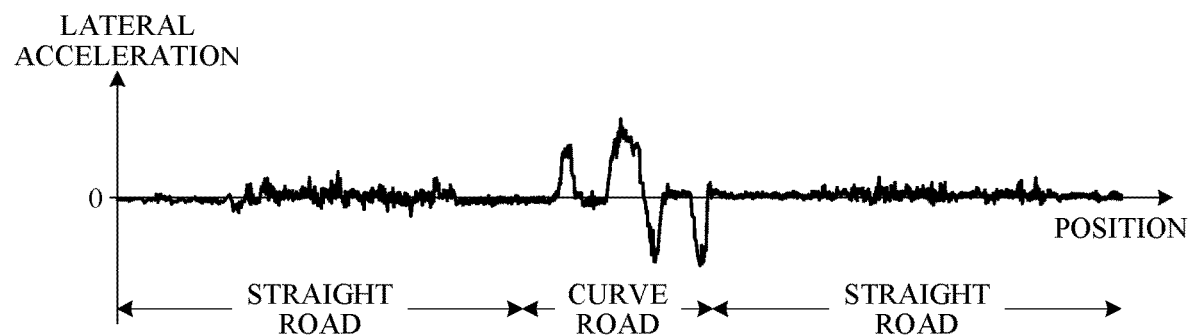
FIG. 7A is a diagram illustrating an example of composite driving information before a variable filter is applied.
Figure 7B:
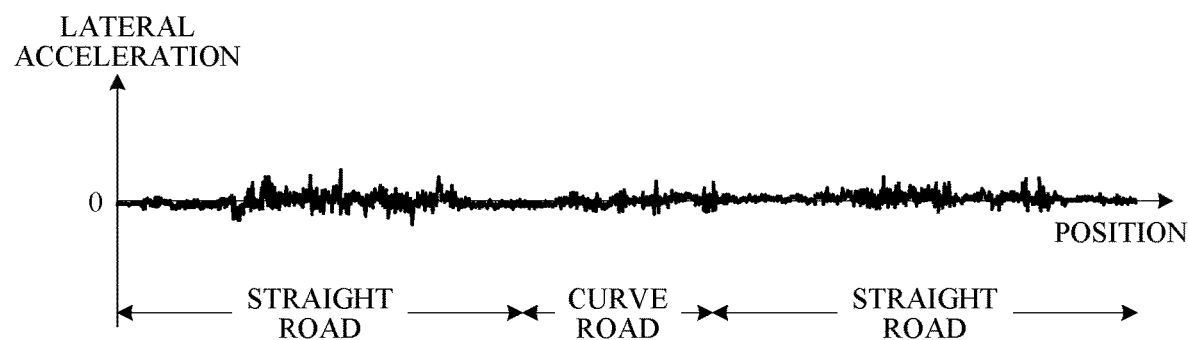
FIG. 7B is a diagram illustrating an example of composite driving information after the variable filter is applied.

FIG. 7A illustrates an example of composite driving information before a variable filter is applied. As illustrated in FIG. 7A, the lateral acceleration on a curve road has a larger value than that on a straight road because it includes more lateral acceleration caused by the roll motion or centrifugal force of the vehicles 20. FIG. 7B illustrates an example of the composite driving information of FIG. 7A after a variable filter is applied. By removing the component of lateral acceleration caused by roll motion or centrifugal force from the composite driving information using a variable filter, the composite driving information illustrated in FIG. 7B is acquired. Then, the road surface roughness evaluation unit 112 derives the road surface roughness values based on the composite driving information from which the component of lateral acceleration caused by roll motion or centrifugal force is removed and the correlation between the road surface roughness values and lateral acceleration.

Figure 8:
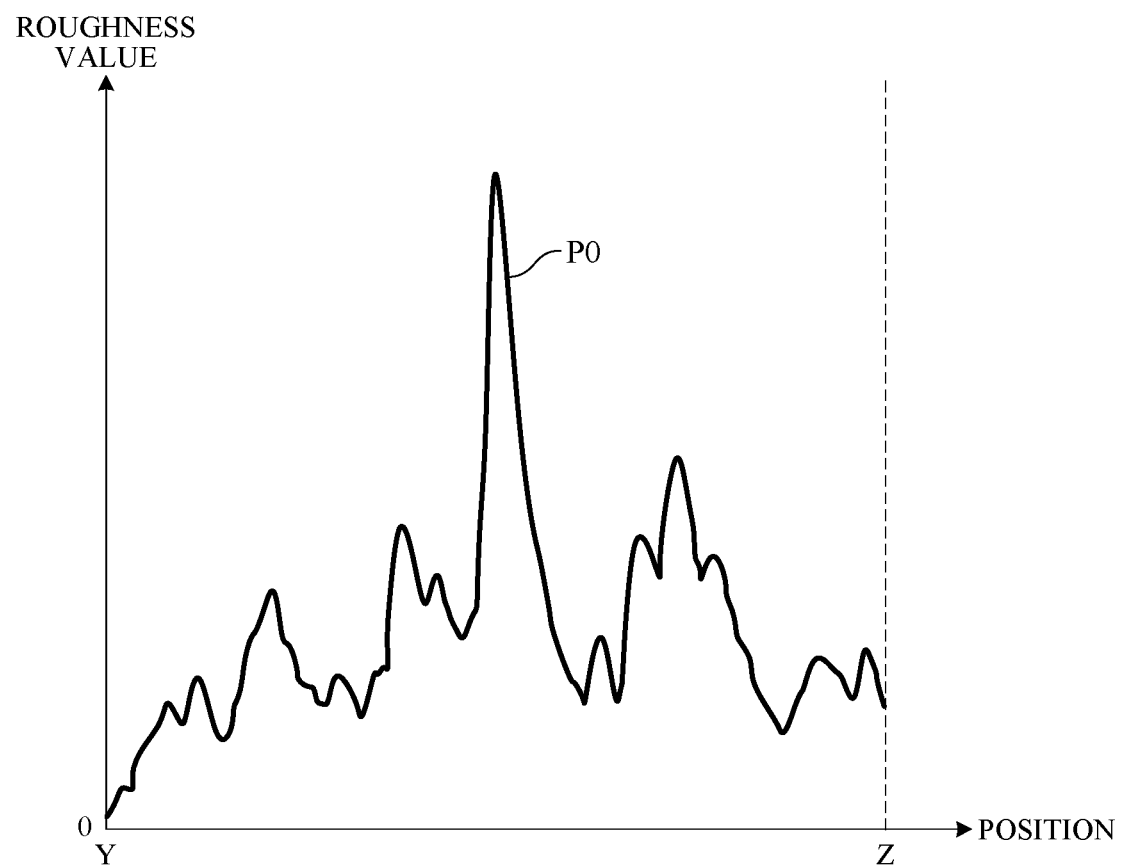
FIG. 8 is a diagram illustrating an example of the road surface profile information.

The evaluation result output unit 113 outputs the road surface roughness information evaluated by the road surface roughness evaluation unit 112, that is, the road surface roughness values, in association with the road information acquired by the information acquisition unit 111. The information output at this time is referred to as road surface profile information. FIG. 8 illustrates an example of the road surface profile information. A characteristic P0 in the figure represents the road surface roughness value derived based on the composite driving information illustrated in FIG. 5. The horizontal axis indicates the position (latitude) of the vehicles 20 in the driving direction along the traveling lane, and the vertical axis indicates the road surface roughness values. When the evaluation result output unit 113 receives an output instruction for the road surface profile from a terminal such as a road management company via the communication network 2, it outputs the road surface profile information to the terminal from which the output instruction was transmitted or to a predetermined output destination terminal. The output instruction for the road surface profile may be input to the road surface evaluation apparatus 10 via a control unit (not illustrated) included in the road surface evaluation apparatus 10. The road surface profile information is information that can be displayed on a display device such as a display, and the user (for example, a road management company) can check the road surface profile by displaying the road surface profile information on the display included in the user's terminal.

Figure 9:
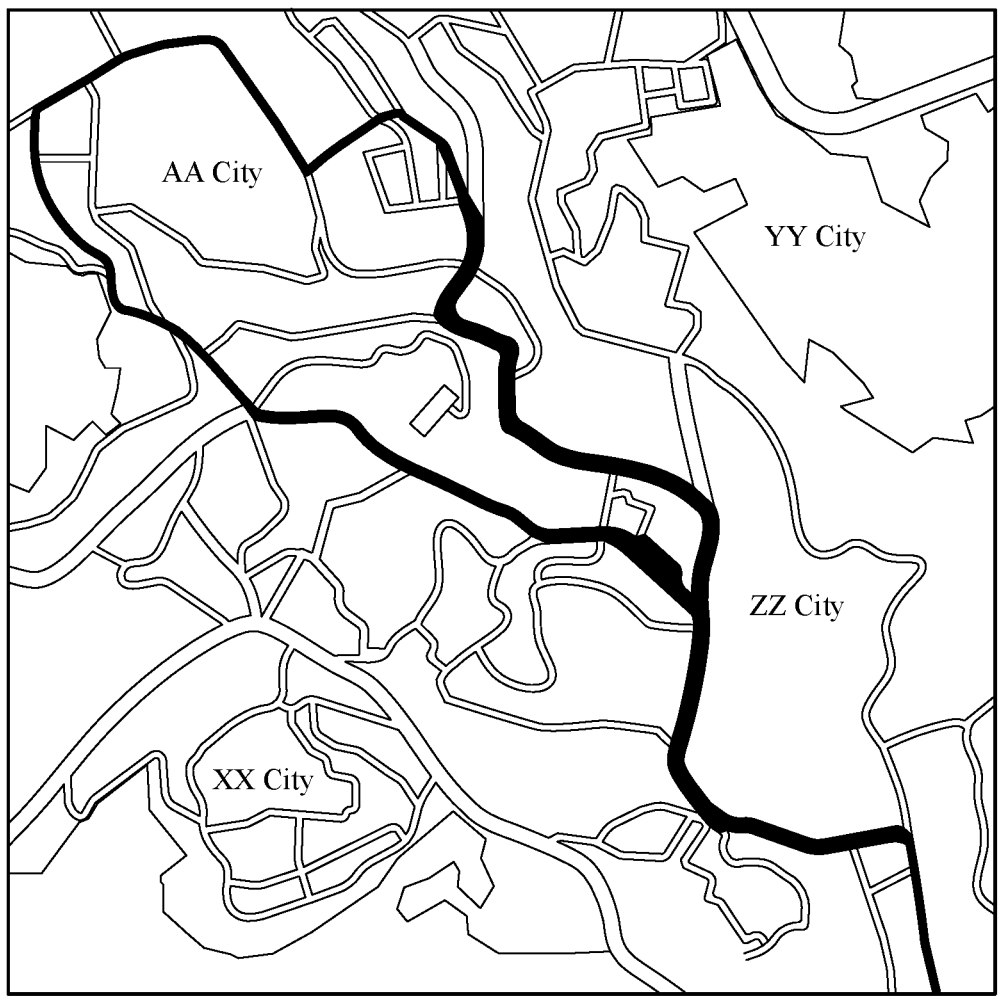
FIG. 9 is a diagram illustrating an example of data accumulation level information.

The evaluation result output unit 113 further outputs the accumulation level of driving information acquired by the information acquisition unit 111 over a predetermined period, in association with the road information acquired by the information acquisition unit 111. The information output at this time is referred to as data accumulation level information. Specifically, the evaluation result output unit 113 outputs map information in which roads (sections) where the accumulation level of driving information over a predetermined period (for example, one month) is equal to or more than a predetermined value (for example, 1000 Hz) are filled with a predetermined color as data accumulation level information. Like the road surface profile information, the data accumulation level information is information that can be displayed on a display device such as a display. By displaying the data accumulation level information on the display device, the user can identify roads (sections) where the accumulation level of driving information is less than a predetermined value, that is, roads (sections) where road surface roughness is not adequately evaluated. FIG. 9 illustrates an example of data accumulation level information. In the figure, roads filled in black represent roads where road surface roughness is adequately evaluated. When the evaluation result output unit 113 receives an output instruction for the data accumulation level from a terminal of a road management company or the like via the communication network 2, it outputs the data accumulation level information to the terminal from which the output instruction was transmitted or to a predetermined output destination terminal. Note that the output instruction for the data accumulation level may be input to the road surface evaluation apparatus 10 via a control unit (not illustrated) included in the road surface evaluation apparatus 10. In addition, the display mode of data accumulation level information is not limited to that illustrated in FIG. 9, and the data accumulation level information may be output in other display modes that can identify roads where road surface roughness is not adequately evaluated.

The communication control unit 114 controls a communication unit (not illustrated) to transmit and receive data to and from external devices and others. More specifically, the communication control unit 114 transmits and receives data via the communication network 2 to and from the in-vehicle terminals 30 of the vehicles 20 and terminals of road management companies or the like. The communication control unit 114 also receives output instructions for the road surface profile and data accumulation level transmitted from road management companies and other terminals via the communication network 2. In addition, the communication control unit 114 acquires map information and other information from various servers connected to the communication network 2 periodically or at arbitrary times. The communication control unit 114 then stores the information acquired from the various servers in the memory unit 120.

Figure 10:
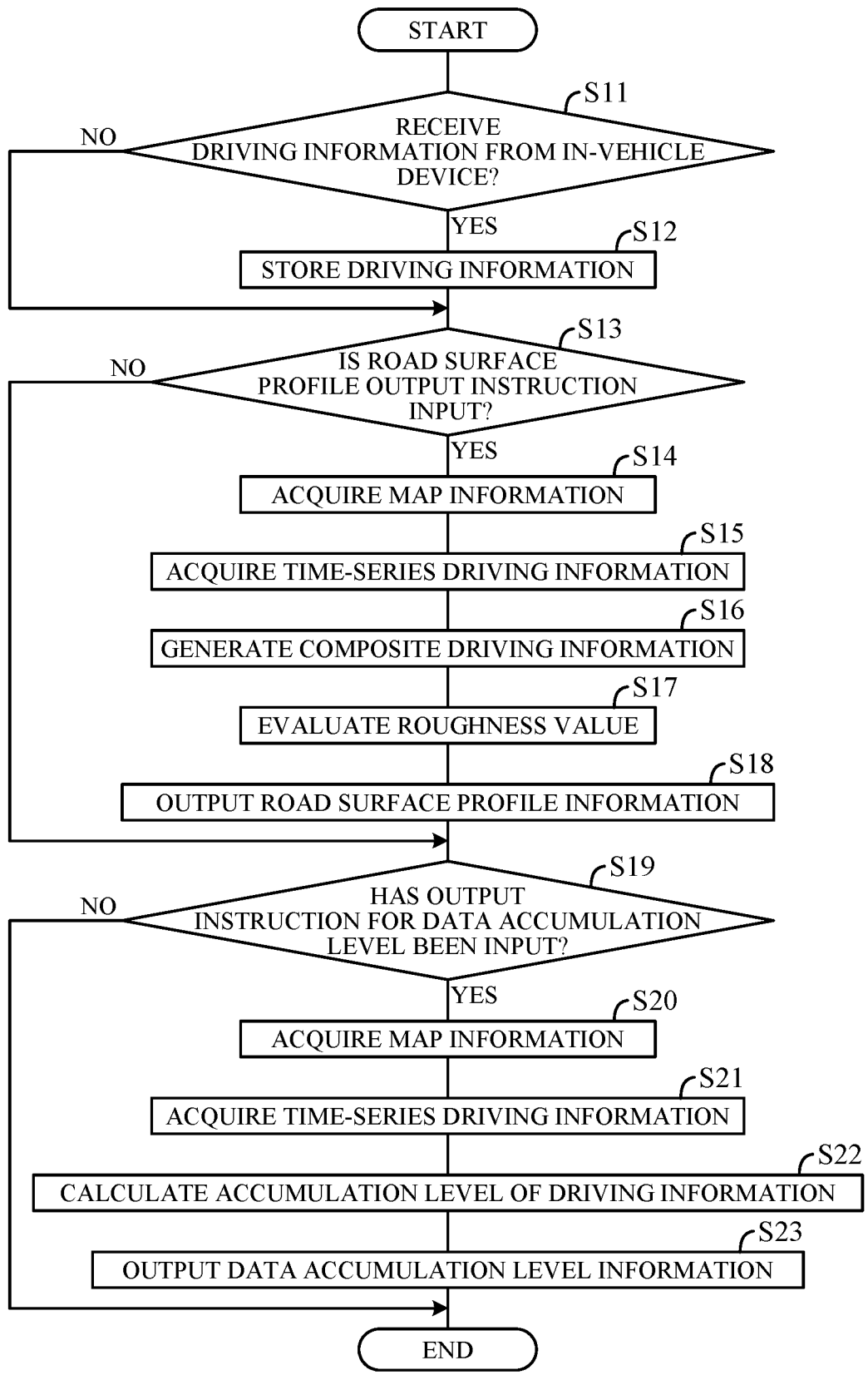
FIG. 10 is a flowchart illustrating an example of processing executed by the processing unit in FIG. 3.

FIG. 10 is a flowchart illustrating an example of processing executed by the processing unit 110 (CPU) of the road surface evaluation apparatus 10 according to a predetermined program. The processing illustrated in this flowchart is repeated at a predetermined cycle while the road surface evaluation apparatus 10 is running. First, in step S11, it is determined whether driving information has been received from any of the in-vehicle terminals 30 of the vehicles 20. If NO in step S11, the processing proceeds to step S13. In step S11, driving information may be received from the in-vehicle terminals 30 of a plurality of vehicles 20.

If YES in step S11, in step S12, the driving information received in step S11 is stored in the memory unit 120 together with the vehicle ID associated with the driving information. In step S13, it is determined whether or not an output instruction for the road surface profile has been input (received).

The output instruction for the road surface profile includes section information that can identify the road section to be output. The section information is information that indicates the name and section of the road to be output, for example, "road: National Route X, section: latitude Y to Z". Note that, in a case where the road has a plurality of lanes on each side, such as two lanes on one side, the section information may include information on the lane to be output, such as "road: National Route X, lane: right end, section: latitude Y to Z". Information other than latitude may be used to specify the section to be output. For example, longitude may be used instead of latitude or in addition to latitude. Alternatively, the distance from the start point of the section may be used.

If NO in step S13, the processing proceeds to step S19. If YES in step S13, in step S14, map information is read from the memory unit 120 and road information included in the map information is acquired. In step S15, the time-series driving information of the vehicles 20 is acquired from the memory unit 120. More specifically, based on the section information included in the output instruction for the road surface profile and the road information acquired in step S14, the time-series driving information for the section to be output, which is stored in the memory unit 120, is acquired.

At this time, when there is a plurality of vehicles 20 that have driven the section to be output, the time-series driving information corresponding to each of the vehicles 20 is acquired.

In step S16, the time-series driving information corresponding to each of the plurality of vehicles 20 acquired in step S15 is combined to generate composite driving information. At this time, as described above, the component of lateral acceleration caused by roll motion or centrifugal force is removed from the generated composite driving information. Next, in step S17, road surface roughness is evaluated based on the composite driving information generated in step S16.

Next, in step S18, the road surface roughness information (roughness value) evaluated in step S17 is associated with the road information acquired in step S14, that is, road surface profile information is output. This allows the road surface profile information to be displayed on a display device such as a display, allowing the user to check the road surface profile information.

Subsequently, in step S19, it is determined whether or not an output instruction for the data accumulation level has been input (received). If NO in step S19, the processing ends. If YES in step S19, in step S20, map information is read from the memory unit 120 and road information included in the map information is acquired. At this time, when the road information has already been acquired in step S14, the processing in step S20 may be skipped. In step S21, the time-series driving information of the vehicles 20 stored in the memory unit 120 is acquired. At this time, when the time-series driving information of the vehicles 20 has already been acquired in step S15, the processing in step S21 may be skipped. In step S22, the accumulation level of driving information over a predetermined period (for example, for one month) is calculated based on the acquired time-series driving information. Finally, in step S23, the evaluation result output unit 113 outputs map information in which roads (sections) where the accumulation level of driving information over a predetermined period is equal to or more than a predetermined value (for example, 1000 Hz) are filled with a predetermined color as data accumulation level information. Even if YES in step S13, the processing may proceed to step S19 when the time-series driving information for the vehicle 20 stored in the memory unit 120 that has not been output is less than a predetermined amount. Similarly, even if YES in step S19, the processing may end when the time-series driving information for the vehicles 20 stored in the memory unit 120 that has not been output is less than a predetermined amount. In such a case, information to notify that the time-series driving information that has not been output is less than a predetermined amount may be output to the terminal or other device from which the output instruction for the road surface profile was transmitted.

Note that, like the output instruction for the road surface profile, the output instruction for the road accumulation level may include section information that can identify the road section to be output. In that case, in step S22, the accumulation level of driving information over a predetermined period is calculated according to the time-series driving information for the section to be output, based on the section information included in the output instruction for the data accumulation level and the road information acquired in step S20. Then, in step S23, the data accumulation level information corresponding to the section to be output is output.

According to the embodiment of the present invention, the following effects can be achieved.

(1) The road surface evaluation apparatus 10 includes: an information acquisition unit 111 that acquires driving information of each of a plurality of vehicles 20, including position information of the vehicles 20 while driving and acceleration information indicating acceleration of the vehicles 20, as well as map information including road information: a road surface roughness evaluation unit 112 that evaluates the road roughness based on the acceleration information of the vehicles 20 acquired by the information acquisition unit 111; and an evaluation result output unit 113 that outputs the road surface roughness information evaluated by the road surface roughness evaluation unit 112 in association with the road information acquired by the information acquisition unit 111.

This configuration allows evaluation of road surface roughness based on driving information (acceleration information) transmitted from each of the vehicles 20, which are ordinary vehicles, and eliminates the need for a dedicated vehicle (the vehicle V1 including a measuring instrument MA of FIG. 6A) to drive on the roads to be evaluated for road surface roughness. This allows efficient evaluation of the road surface profile of the roads on which the vehicles 20 have driven.

(2) The information acquisition unit 111 acquires driving information acquired in the first cycle by the in-vehicle terminals 30 installed in the plurality of vehicles 20, the road surface roughness evaluation unit 112 combines the driving information from the in-vehicle terminals 30 of each of the plurality of vehicles 20 acquired by the information acquisition unit 111 to generate composite driving information of a second cycle which is shorter than the first cycle, and evaluates the road surface roughness based on the composite driving information. This allows accurate evaluation of road surface roughness without increasing the sampling period of driving information (lateral acceleration) in each of the vehicles 20.

(3) The acceleration of the vehicles 20 indicated by the acceleration information is the acceleration of the vehicles 20 in the left-right direction, and the driving information further includes information indicating the roll angle and centrifugal force of the vehicles 20. The road surface roughness evaluation unit 112 executes a correction to remove the influence of the roll angle or centrifugal force of the vehicles 20 on the acceleration of the vehicles 20 indicated by the acceleration information, and evaluates the road surface roughness based on the corrected acceleration information of the plurality of vehicles 20. This allows accurate evaluation of the road surface profile of the road on which the vehicles 20 have driven, even when evaluating road surface roughness on roads with a mixture of straight and curved portions.

(4) The information acquisition unit 111 further acquires correlation data indicating the correlation between the acceleration of the vehicles 20 and the road surface roughness. The road surface roughness evaluation unit 112 derives roughness information based on the correlation data acquired by the information acquisition unit 111. This allows more accurate derivation of road surface roughness values.

(5) The information acquisition unit 111 further acquires unique information that can identify the type or state of predetermined components constituting the vehicles 20. The road surface roughness evaluation unit 112 corrects the acceleration indicated by the acceleration information of the plurality of vehicles 20 acquired by the information acquisition unit 111 based on the unique information acquired by the information acquisition unit 111, and evaluates the road surface roughness based on the corrected acceleration information of the plurality of vehicles 20. This allows accurate derivation of road surface roughness values even when the plurality of vehicles 20 include vehicles of different models and grades.

(6) The evaluation result output unit 113 outputs the road surface profile information, which associates the roughness information derived by the roughness evaluation unit 112 with the road information acquired by the information acquisition unit 111, in a displayable manner. This allows users to visually recognize the road surface profile and easily estimate which roads need to be repaired.

(7) The evaluation result output unit 113 further outputs data accumulation level information, which associates the accumulation level of driving information acquired from each of the plurality of vehicles 20 by the information acquisition unit 111 over a predetermined period with the road information acquired by the information acquisition unit 111, in a displayable manner. This allows the detection of roads (sections) where the accumulation level of driving information is less than a predetermined value, that is, where the road surface roughness has not been adequately evaluated.

(8) The road surface evaluation apparatus of the present embodiment can also be used as a road surface evaluation method. The road surface evaluation method includes having a computer execute: a step of acquiring driving information of each of a plurality of vehicles 20, including position information of the vehicles 20 while driving and acceleration information indicating acceleration of the vehicles 20 (S11); a step of acquiring map information including road information (S14): a step of evaluating the road roughness based on the acquired acceleration information of the plurality of vehicles 20 (S17); and a step of outputting the evaluated road surface roughness information in association with the road information (S18) (FIG. 10). This allows evaluation of road surface roughness based on driving information (acceleration information) transmitted from each vehicle 20, which are ordinary vehicles, and efficient evaluation of the road surface profile of the road on which the vehicles 20 have driven without the use of a dedicated vehicle.

The above embodiment can be modified into various forms. Hereinafter, modifications will be described.

Normally, even when a plurality of vehicles 20 drive on the same road, the road surface roughness values derived by the road surface roughness evaluation unit 112 may differ when the models or grades of the vehicles 20 are different. The reason for this is that the suspension, tires, and other components installed in each vehicle 20 that affect the vehicle's motion are different for each model and grade. In consideration of this point, in the present modification, the roughness evaluation unit 112 corrects the lateral acceleration included in the driving information (acceleration information) of each vehicle 20 according to the model and grade of each vehicle 20, and then generates the composite driving information.

In general, the lower the shock-absorbing performance (vertical shock absorption performance) of the suspension and tires, the more easily shocks and vibrations caused by uneven road surfaces are transmitted to the vehicle, and the greater the lateral acceleration detected by the acceleration sensors 33 in the vehicles 20. Usually, the shock-absorbing performance of suspension and tires increases with the grade between the same models, and with the ride comfort between different models. This causes variation in the lateral acceleration detected in the vehicles 20, even when the vehicles 20 drive on the same road. This prevents adequate evaluation of road surface roughness values.

Therefore, the information acquisition unit 111 identifies the models and grades of the vehicles 20 based on the vehicle ID (for example, VIN number) of the vehicles 20 associated with the driving information, and acquires the correction coefficients corresponding to the identified models and grades from the correction coefficient table described below. The correction coefficient table is stored in the memory unit 120 in advance. The roughness evaluation unit 112 corrects the lateral acceleration indicated by the driving information (acceleration information) of each vehicle 20 using the correction coefficients acquired by the information acquisition unit 111.

FIG. 11 illustrates an example of a correction coefficient table. As illustrated in FIG. 11, the correction coefficient table stores unique information that includes information that can identify the types of predetermined components that constitute the vehicles and the correction coefficients corresponding to these types, in association with the models and grades of the vehicles. Predetermined components constituting the vehicles 20 are components that affect the motion of the vehicles 20 while driving, such as suspension and tires. The types of components are, for example, the types of suspension distinguished by spring rate, etc., and the types of tires distinguished by flatness, width, rubber hardness, and the like.

The correction coefficients are determined in advance by driving the vehicles 20 of different models and grades on a predetermined road (for example, road RD of FIG. 4A) and based on the ratio of accelerations detected by the acceleration sensor 33 of each vehicle 20 while driving. Note that, in the example illustrated in FIG. 11, the correction coefficients for suspension are $\alpha 11$, $\alpha 12$, $\alpha 13$, and $\alpha 21$. Similarly, the correction coefficients for tires are $\beta 11$, $\beta 12$, $\beta 13$, and $\beta 21$.

For example, when the model of a vehicle 20 is "ABC" and the grade is "low", the information acquisition unit 111 reads $\alpha 13$ as the correction coefficient for suspension and $\beta 13$ as the correction coefficient for tires from the correction coefficient table. The roughness evaluation unit 112 multiplies those correction coefficients by the lateral acceleration indicated by the driving information (acceleration information) of each vehicle 20. The roughness evaluation unit 112 thus corrects the acceleration contained in the driving information (acceleration information) of each vehicle 20, and then generates the composite driving information. This configuration allows the derivation of road surface profiles that can be adequately evaluated independent of the type of the vehicles 20 driving on the road.

In the above embodiment, the position information acquired by the position measurement sensor 32 (GPS sensor) is transmitted to the road surface evaluation apparatus 10, but the position information acquired by inertial navigation may be transmitted to the road surface evaluation apparatus 10 as position information. Specifically, in addition to each of the sensors 32 to 35, the in-vehicle terminal 30 may include a gyro sensor to detect angular velocity and a travel distance sensor to detect trip distance. The processing unit 310 may then estimate the position of the vehicle 20 by inertial navigation using the values detected by the gyro sensor and the travel distance sensor. That is, the processing unit 310 may determine the vehicle position using a hybrid method with inertial navigation. This allows accurate recognition of the position of each vehicle 20, which allows more accurate evaluation of road surface roughness. Note that the in-vehicle terminal 30 (processing unit 310) may estimate the position of the vehicle 20 based on the travel distance detected by the travel distance sensor.

In the above embodiment, the road surface roughness evaluation unit 112 estimated the roll angle and centrifugal force of the vehicle 20 based on the vehicle speed detected by the vehicle speed sensor 35 and the steering angle detected by the steering angle sensor 34. However, the in-vehicle terminal 30 may have a sensor that detects the roll angle of the vehicle 20 and a sensor that detects centrifugal force, and the communication control unit 312 may include the roll angle and centrifugal force information detected by those sensors in the driving information and transmit it to the road surface evaluation apparatus 10.

In the above embodiment, the road surface roughness values are expressed in terms of IRI, but the road surface roughness values may be expressed in terms of other indices. When the road surface roughness value obtained as training data is expressed by an index other than IRI, the road surface roughness evaluation unit 112 may derive the road surface roughness value expressed by that index.

In the above embodiment, the first cycle (1 Hz) of driving information transmitted from n vehicles 20 was combined to generate the second cycle (1×n Hz) of composite driving information. However, the method of generating composite driving information is not limited to this. For example, the vehicles 20 with similar vehicle speeds (for example, the vehicles 20 with an average speed difference of 10 km/h or less from each other) may be extracted from n vehicles 20, and the driving information of the extracted vehicles 20 may be combined to generate composite driving information. As described above, by generating the composite driving information excluding the driving information of the vehicles 20 having extremely different vehicle speeds, more accurate road surface roughness values can be derived, allowing more accurate evaluation of road surface roughness. For example, the driving information of each vehicle 20 may be corrected according to the vehicle speed of each vehicle 20 before generating the composite driving information.

In the above embodiment, the information acquisition unit 111 acquires the lateral acceleration of the vehicles 20 detected by the acceleration sensor 33 as information indicating the motion of the vehicles 20 as the driving information acquisition unit, but the information indicating the motion of the vehicles 20 is not limited to the lateral acceleration of the vehicles 20 detected by the acceleration sensor 33. That is, the configuration of the information acquisition unit 111 may be any configuration, such as detecting front/rear acceleration, as long as it acquires information indicating the motion of the vehicles 20.

In the above embodiment, the information acquisition unit 111 functions as a map information acquisition unit to acquire map information from the memory unit 120, including road information on which the vehicles 20 are driving, but the map information may be stored on an external server or external storage device. In other words, any configuration of the information acquisition unit 111 may be used as long as it acquires map information that includes information on the road on which the vehicles 20 are driving.

In the above embodiment, the information acquisition unit 111 functions as a unique information acquisition unit to acquire unique information including correction coefficients from the correction coefficient table stored in the memory unit 120, but the correction coefficient table may be stored on an external server or external storage device. The information acquisition unit 111 may then acquire the correction factor table from an external server or other source via the communication control unit 14.

In the above embodiment, the road surface roughness evaluation unit 112 functions as a correlation data acquisition unit to acquire correlation data between road surface roughness values and lateral acceleration by machine learning using pre-measured road surface roughness values and lateral acceleration as training data. However, the correlation between road surface roughness values and lateral acceleration may be derived in advance from the training data of road surface roughness values and lateral acceleration, and the derived information (correlation data) may be stored in the memory unit 120 or an external server. The information acquisition unit 111 may then act as the correlation data acquisition unit to acquire correlation data stored in the memory unit 120 and others.

In the above embodiment, the evaluation result output unit 113 functions as an output unit to output road surface profile information and data accumulation level, but the evaluation result output unit 113 may output other information. For example, the evaluation result output unit 113 may detect roads (sections or points) on which the accumulation level of driving information is less than a predetermined value based on the accumulation level and road information, and output driving request information via the communication control unit 114 such that the vehicles 20 are requested to drive on the detected road. In this case, the evaluation result output unit 113 may output the driving request information not to all the vehicles 20, but to the vehicles 20 within a predetermined distance (for example, within 1 km) from the road (section or point) where the accumulation level of driving information is less than a predetermined value, based on the position information of the vehicles 20 acquired by the information acquisition unit 111. Incentives such as discount coupons (electronic coupons) that can be used for certain services may be given to the users of the vehicles 20 that have driven on the roads specified in response to the driving request information. Accordingly, it is expected that the road surface roughness can be more accurately evaluated.

Furthermore, in the above embodiment, the road surface roughness evaluation unit 112 uses correlation data to derive the road surface roughness value corresponding to the vehicle position on the road from the lateral acceleration, but the road surface roughness value may be derived by other methods. For example, parameters for calculating the road surface roughness values may be derived from the pre-measured road surface roughness values and lateral acceleration, and the derived parameters may be stored in the memory unit 120. In that case, the road surface roughness evaluation unit 112 calculates the road surface roughness value corresponding to the vehicle position on the road from the lateral acceleration using the above parameters stored in the memory unit 120.

The above explanation is an explanation as an example and the present invention is not limited to the aforesaid embodiment or modifications unless sacrificing the characteristics of the invention. The aforesaid embodiment can be combined as desired with one or more of the aforesaid modifications. The modifications can also be combined with one another.

REFERENCE SIGNS LIST 10 road surface evaluation apparatus. 20, 20-1 to 20-$n$ vehicle. 30 in-vehicle terminal. 110 processing unit, 111 information acquisition unit, 112 road surface profile evaluation unit, 113 evaluation result output unit (output unit), 120 memory unit

The invention claimed is:

1. A road surface evaluation apparatus comprising:
an electronic control unit having a microprocessor and a memory connected to the microprocessor, wherein
the microprocessor is configured to perform
acquiring driving information of each of a plurality of vehicles, including position information of the plurality of vehicles while driving, acceleration information indicating acceleration of the plurality of vehicles, and map information including road information;
evaluating a road surface roughness based on the acceleration information of the plurality of vehicles; and
outputting information on the road surface roughness in association with the road information, wherein
the microprocessor is configured to perform
the acquiring including acquiring the driving information acquired in a first cycle by in-vehicle terminals installed in the plurality of vehicles,
the evaluating including combining the driving information of the vehicles whose average speed differences from each other are within a predetermined value among the driving information acquired from each of the in-vehicle terminals of the plurality of vehicles to generate composite driving information corresponding to a second cycle which is shorter than the first cycle, and evaluating the road surface roughness based on the composite driving information.

2. The road surface evaluation apparatus according to claim 1, wherein
the position information includes at least one of position information acquired by a position measurement sensor and position information acquired by an inertial navigation.

3. The road surface evaluation apparatus according to claim 1, wherein
the acceleration of the plurality of vehicles indicated by the acceleration information is the acceleration in a left-right direction of the plurality of vehicles,
the driving information further includes information indicating a roll angle and centrifugal force of the plurality of vehicles, and
the microprocessor is configured to perform
the evaluating including executing a correction to remove an influence of the roll angle or centrifugal force of the plurality of vehicles on the acceleration of the plurality of vehicles indicated by the acceleration information, and evaluating the road surface roughness based on the acceleration information of the plurality of vehicles after the correction.

4. The road surface evaluation apparatus according to claim 1, wherein
the microprocessor is configured to perform
the acquiring including acquiring correlation data indicating a correlation between the acceleration of the plurality of vehicles and the road surface roughness, and
the evaluating including deriving the information on the road surface roughness based on the correlation data.

5. The road surface evaluation apparatus according to claim 1, wherein
the microprocessor is configured to perform
the acquiring including acquiring unique information that can identify a type or state of a predetermined component constituting each of the plurality of vehicles, and
the evaluating including correcting the acceleration indicated by the acceleration information of the plurality of vehicles based on the unique information to evaluate the road surface roughness based on the acceleration information of the plurality of vehicles after the correction.

6. The road surface evaluation apparatus according to claim 1, wherein
the microprocessor is configured to perform
the outputting including outputting information, which associates the information on the road surface roughness with the road information, in a displayable manner.

7. The road surface evaluation apparatus according to claim 1, wherein
the microprocessor is configured to perform
the outputting including outputting information, which associates an accumulation level of the driving information over a predetermined period with the road information, in a displayable manner.

8. The road surface evaluation apparatus according to claim 7, wherein
the microprocessor is configured to perform
the outputting including detecting a road on which the accumulation level of driving information is less than a predetermined value based on the road information to output driving request information for requesting to drive on the detected road.

9. The road surface evaluation apparatus according to claim 8, wherein
the microprocessor is configured to perform
the outputting including, based on the position information of the plurality of vehicles, outputting the driving request information to a vehicle within a predetermined distance from a road on which the accumulation level of driving information is less than a predetermined value.

10. The road surface evaluation apparatus according to claim 1, wherein
the microprocessor is configured to perform
the evaluating including generating the composite driving information by superimposing the driving information of the first cycle from each of the in-vehicle terminals of the plurality of vehicles based on positions indicated by the position information included in the driving information.

11. A road surface evaluation method comprising:
acquiring driving information of each of a plurality of vehicles, including position information of the plurality of vehicles while driving, acceleration information indicating acceleration of the plurality of vehicles, and map information including road information;
evaluating a road surface roughness based on the acceleration information of the plurality of vehicles; and
outputting information on the road surface roughness in association with the road information, wherein
the acquiring includes acquiring the driving information acquired in a first cycle by in-vehicle terminals installed in the plurality of vehicles,
the evaluating includes combining the driving information of the vehicles whose average speed differences from each other are within a predetermined value among the driving information acquired from each of the in-vehicle terminals of the plurality of vehicles to generate composite driving information corresponding to a second cycle which is shorter than the first cycle, and evaluating the road surface roughness based on the composite driving information.

* * * * *